United States Patent [19]

Hitchcock et al.

[11] Patent Number: 4,609,596
[45] Date of Patent: Sep. 2, 1986

[54] ELECTROCHEMICAL DEVICES UTILIZING MOLTEN ALKALI METAL ELECTRODE-REACTANT

[75] Inventors: David C. Hitchcock, Omaha, Nebr.; Catherine C. Mailhe, Berkeley; Lutgard C. De Jonghe, Oakland, both of Calif.

[73] Assignee: The United States of America as represented by the United States Department of Energy, Washington, D.C.

[21] Appl. No.: 753,496

[22] Filed: Jul. 10, 1985

[51] Int. Cl.⁴ .............................................. H01M 4/36
[52] U.S. Cl. ..................................... 429/104; 429/191
[58] Field of Search ............... 429/105, 191, 104, 193, 429/11

[56] References Cited

U.S. PATENT DOCUMENTS

| | | | |
|---|---|---|---|
| 4,356,241 | 10/1982 | Wright et al. | 429/104 |
| 4,407,912 | 10/1983 | Virkar et al. | 429/104 |
| 4,430,393 | 2/1984 | Bennett et al. | 429/105 X |

Primary Examiner—Charles F. Lefevour
Attorney, Agent, or Firm—Harold M. Dixon; Roger S. Gaither; Judson R. Hightower

[57] ABSTRACT

Electrochemical cells are provided with a reactive metal to reduce the oxide of the alkali metal electrode-reactant. Cells employing a molten alkali metal electrode, e.g., sodium, in contact with a ceramic electrolyte, which is a conductor of the ions of the alkali metal forming the electrode, exhibit a lower resistance when a reactive metal, e.g., vanadium, is allowed to react with and reduce the alkali metal oxide. Such cells exhibit less degradation of the electrolyte and of the glass seals often used to joining the electrolyte to the other components of the cell under cycling conditions.

7 Claims, 5 Drawing Figures

ELECTROCHEMICAL DEVICES UTILIZING MOLTEN ALKALI METAL ELECTRODE-REACTANT

The Government has rights in this invention pursuant to Contract No. DE-AC03-76SF00098 awarded by the U.S. Department of Energy.

BACKGROUND OF THE INVENTION

This invention relates to electrochemical cells which contain at least one electrode consisting of a molten alkali metal, and a solid electrolyte which conducts the ions of the alkali metal employed as the electrode.

Several types of cells employing a molten alkali metal electrode-reactant and a solid electrolyte are known.

Secondary batteries with one electrode consisting of liquid sodium and the other consisting of liquid sulfur are described in U.S. Pat. Nos. 3,404,0335 and 3,404,036, both to Kummer, et al. A primary battery employing a molten sodium electrode reactant and a solid electrolyte which conducts sodium ions is described in U.S. Pat. No. 3,458,356 to Kummer, et al.

The relatively high internal resistance of these cells limits the power which they can provide and reduces their efficiency.

One method of lowering the internal resistance of such cells by the addition of selenium, a nonmetallic element, is described in U.S. Pat. No. 4,407,912 to Virkar and Miller.

SUMMARY OF THE INVENTION

It is an object of this invention to provide an electrochemical cell of the type employing a molten alkali metal electrode-reactant in contact with a solid electrolyte which will have a lower resistance to conduction of the ions of the alkali metal.

It is a further object to provide a simple, safe additive for addition to the alkali metal electrode-reactant of an electrochemical cell of the foregoing type to lower resistance and improve performance.

It is a still further object to prevent or reduce the degradation of the electrolyte and/or glass seals in electrochemical cells of the type described.

Other objects of the invention will become readily apparent to those skilled in the art from the following description and the accompanying drawings.

DETAILED DESCRIPTION OF THE INVENTION

Figure 1:
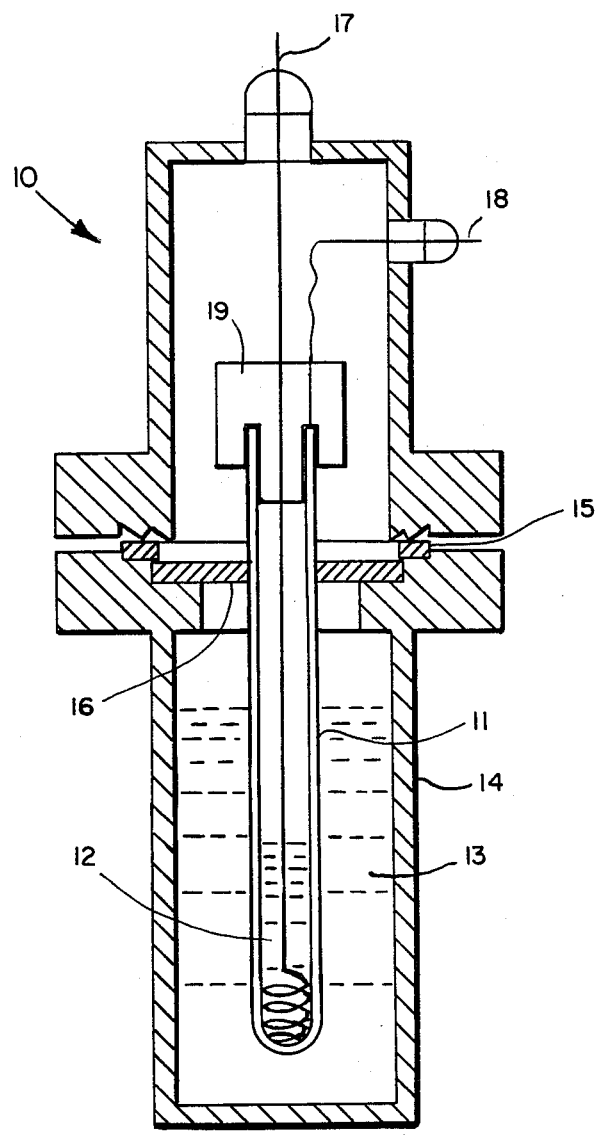
FIG. 1 is a sectional elevational view of a sodium-sodium electrochemical cell.

The present invention involves an improved electrochemical cell with lowered resistance employing a first molten alkali metal electrode and a reactive metal in contact therewith said reactive metal being capable of reducing the oxide of the molten alkali metal. The first electrode is in contact with a solid, impervious electrolyte that separates it from a second electrode which is of a molten material receptive to the mobile metal ion is said electrolyte.

In a presently preferred form of the invention, the first electrode can utilize molten metal sodium as an electrode reactant in contact with a cation-conducting solid electrolyte membrane, such as certain cation-conducting ceramics, for example sodium aluminates such as beta and beta"-alumina, and glasses. A reactant such as sodium polysulfide, another reactive combination, or the same molten alkali metal as is used for the first electrode may be employed as the second electrode of this cell on the opposite side of the cation-conducting solid electrolyte.

The presence of a reactive metal in contact with the alkali metal has been found to reduce significantly the internal resistance of the cell. The presence of the reactive metal may slightly increase the chemical darkening of the electrolyte, but reduces the amount of electromechanical degradation of the electrolyte membrane. While the chemical darkening of the electrolyte is not known to have any adverse effect on the cell, the electromechanical degradation of the electrolyte often limits the life of the cell. Thus, the addition of a reactive metal to the molten alkali metal electrode increases the effective operating life of the cell.

When a preferred cell that had been operated in accordance with the invention with vanadium foil as a reactive metal in the molten sodium electrode was disassembled and a specimen of the beta"-alumina electrolyte was investigated in the analytical scanning electron microscope, no vanadium was detected. Thus, it appears that the reactive metals operate by chemically reducing the alkali metal oxide to a metal. When no reactive metal is present to reduce the alkali metal oxide, this oxide can be adsorbed at the interface between the molten alkali metal and the electrolyte, where it would increase the resistance of the interface. The removal of the oxide by the reactive metal would then lower the cell resistance. When a given current is passed through the cell of the invention with lowered resistance, the voltage across the electrolyte will be less. This retards the degradation of the glass seals. Most glasses include ions that are at least slightly mobile, and the applied voltage causes these ions to migrate, perhaps changing the local composition of the glass and rendering kit less resistant to the reactants in the cell. Or, if the glass has ionic conductivity and develops some electronic conductivity when it is exposed to molten alkali metal, alkali ions are reduced to metal within the glass, causing cracking.

This invention is useful for electrochemical cells employing various alkali metals, such as sodium, and potassium. The preferable form of the invention is in cells employing sodium and an electrolyte containing mobile sodium ions, such as the sodium-sulfur cell.

The preferred solid electrolyte for the sodium-sulfur battery is sodium beta"-alumina, containing about 5 moles of alumina to 1 mole of soda. The material is stabilized by the addition of small amounts of lithia, magnesia, zinc oxide, or yttria or other elements, alone or in combinations, Methods of preparing beta"alumina electrolytes are described in U.S. Pat. Nos. 4,020,134;

3,811,943; 3,719,531; 3,535,163 and 3,465,225, the disclosures thereof being incorporated herein by reference.

Other possible electrolytes includes beta-alumina, a sodium aluminate with a range of compositions of about 9 to 11 moles of alumina to 1 mole of soda, and conductive glasses, such as those described by Kummer, U.S. Pat. No. 3,404,035, and NASICON, a ceramic material containing soda, silica, and zirconia, yttria, and/or phosphate, described in U.S. Pat. Nos. 4,049,891 and 4,117,103 to Hong.

Cells containing a molten sodium electrode-reactant exhibit a large variation in resistance. Generally, the presence of oxygen or water is associated with a high cell resistance, and cells with unusually high resistance generally undergo electromechanical degradation during operation. The addition of a reactive metal capable of reducing the oxide of the alkali metal to a metal in accordance with the invention lowered the resistance of cells normally having a higher than average resistance by about 30%, while the resistance of cells with a normally low resistance before the addition of the reactive metal was lowered by a smaller but still significant amount.

The reactive metal which is in contact with the molten metal of the first electrode is preferably a metal which will reduce the oxide of the molten alkali metal. Such metals are commonly referred to as oxygen scavengers. In a preferred form of the invention, the reactive metal is present in excess of a stoichiometric amount to assure complete reduction of the metal oxide. An excess of the reactive metal or oxygen scavenger is easily achieved as a relatively large excess causes no problems to the reactions involved. In a further preferred form of the invention, the reactive metal can be selected from the group consisting of manganese, zirconium, vanadium, and titanium or combinations thereof.

The reactive metal can be in a form having an increased surface area per unit weight of the metal, including the sponge and powder forms which are preferred for their lowering of resistance more effectively than forms with lesser surface area per unit weight such as foil or lumps.

EXAMPLE 1

Figure 2:
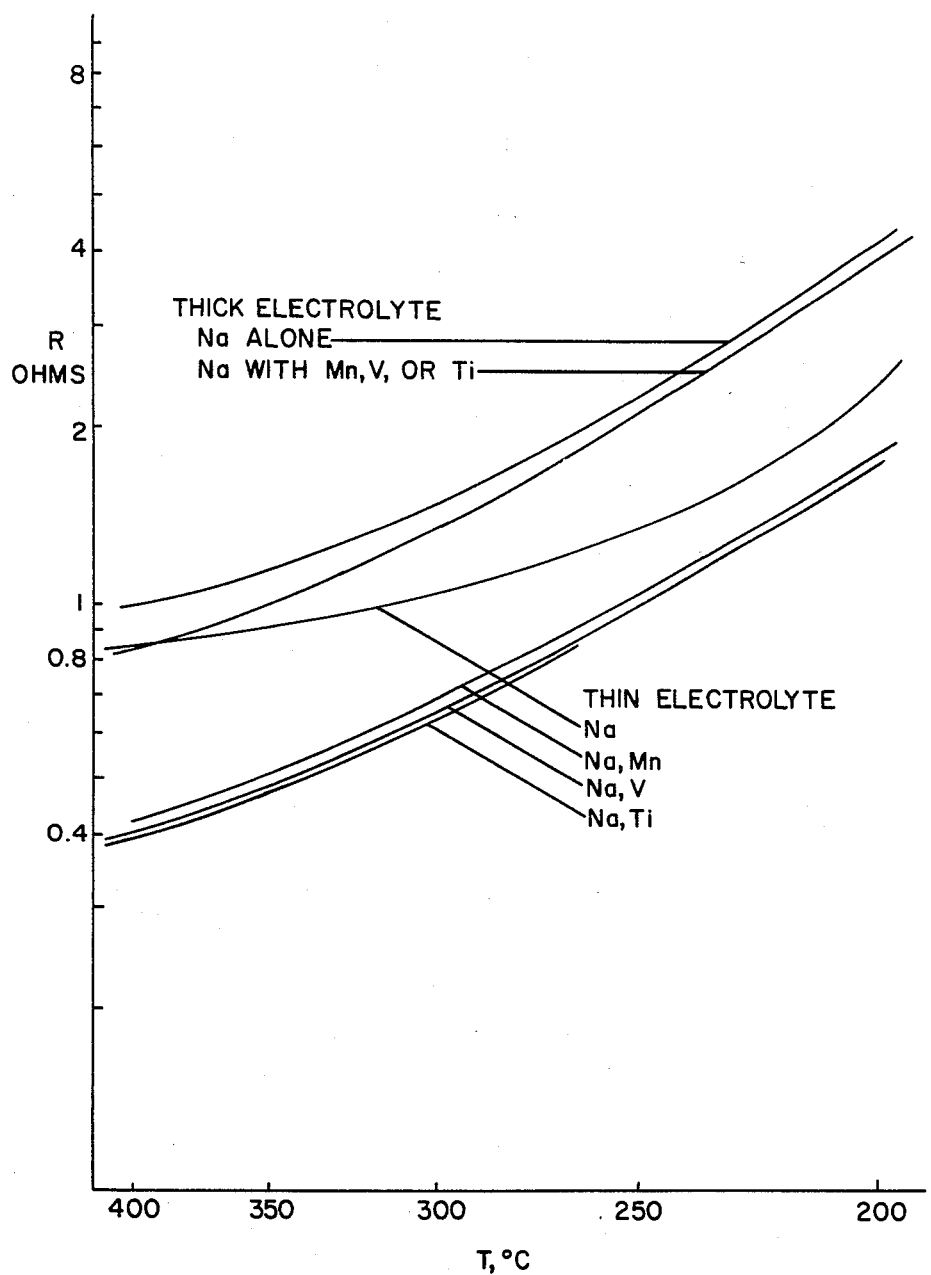
FIG. 2 is a graph illustrating the effect upon the resistance of sodium-sodium electrochemical cells of various reactive metal additives according to the invention over a range of temperatures.

Two cells of the type shown in FIG. 1 were used, one with an electrolyte thickness of 0.2739 centimeters, and the other with a thickness of 0.1077 centimeter. The area of the electrolyte was approximately 0.77 centimeters squared for both cells. The electrolyte tubes were placed in the sodium at about 105° C., with about 1 cc. of sodium inside the tubes. The tubes were heated to 400° C. for 30 minutes to promote wetting of the electrolyte by the molten sodium. The cell was connected to a galvanostat, and the current was linearly swept from 0 mA to −100 mA with the sodium passing into the tube, then to +100 mA with the sodium passing out of the tube, and finally back to zero amperes. The voltage vs. the current was recorded, and the slope of this plot gave the resistance. The temperature was lowered 50°, allowed to stabilize for about 15 minutes, and the resistance was again measured by the same procedure. This process was repeated for temperatures from 400° C. to 22° C. The cell was then reheated to 400° C. and manganese was added. The resistance of the cell decreased, and after about 30 minutes it stabilized. Then the resistance measurements were again made from 400° C. to 200° C. in 50° intervals. The cell was reheated, vanadium was added, and the resistance dropped slightly. Measurements were again made. The cell was reheated, and titanium was added, and the resistance again dropped slightly. The measurements were repeated. FIG. 2 shows the results for these two cells. The log of the cell resistance was plotted vs. T°C., and for the thick cell there was a slight drop in resistance, mainly at high temperature. The thin cell showed a more substantial decrease in resistance, from about 20% at 200° C. to about 50% at 400° C. The resistance was about the same for all three additives, with vanadium reducing the resistance slightly more than manganese, and titanium reducing the resistance slightly more than either manganese or vanadium.

EXAMPLE II

Figure 3:
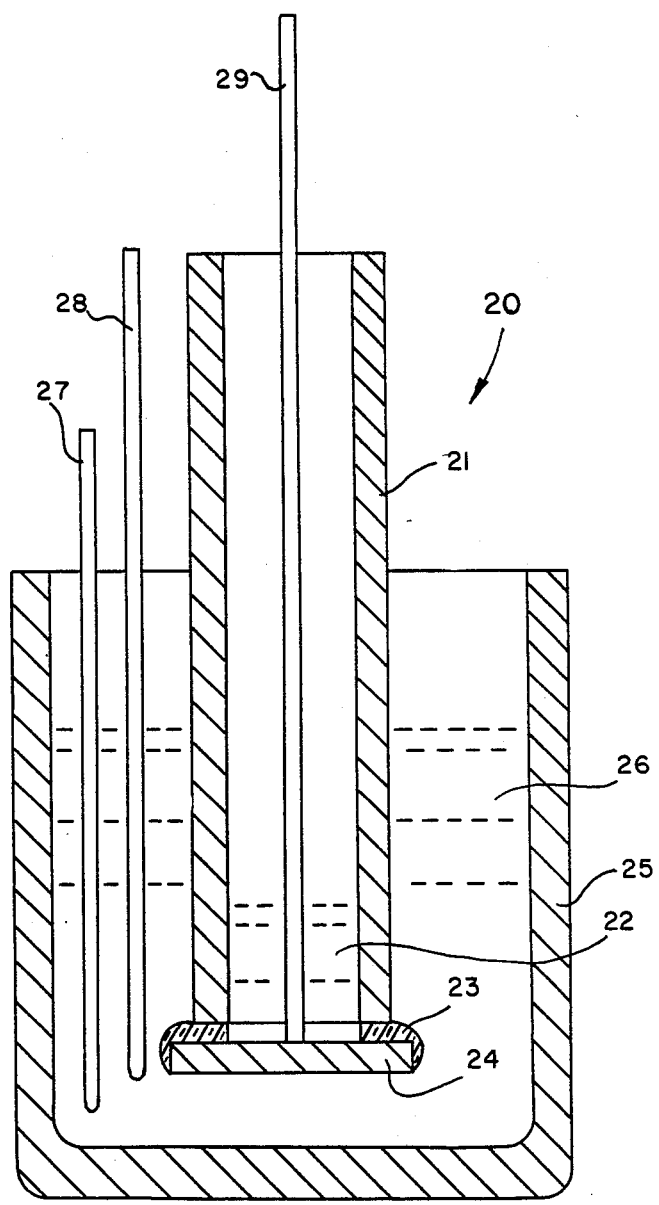
FIG. 3 is a sectional elevational view of a second type of sodium-sodium electrochemical cell.
Figure 4:
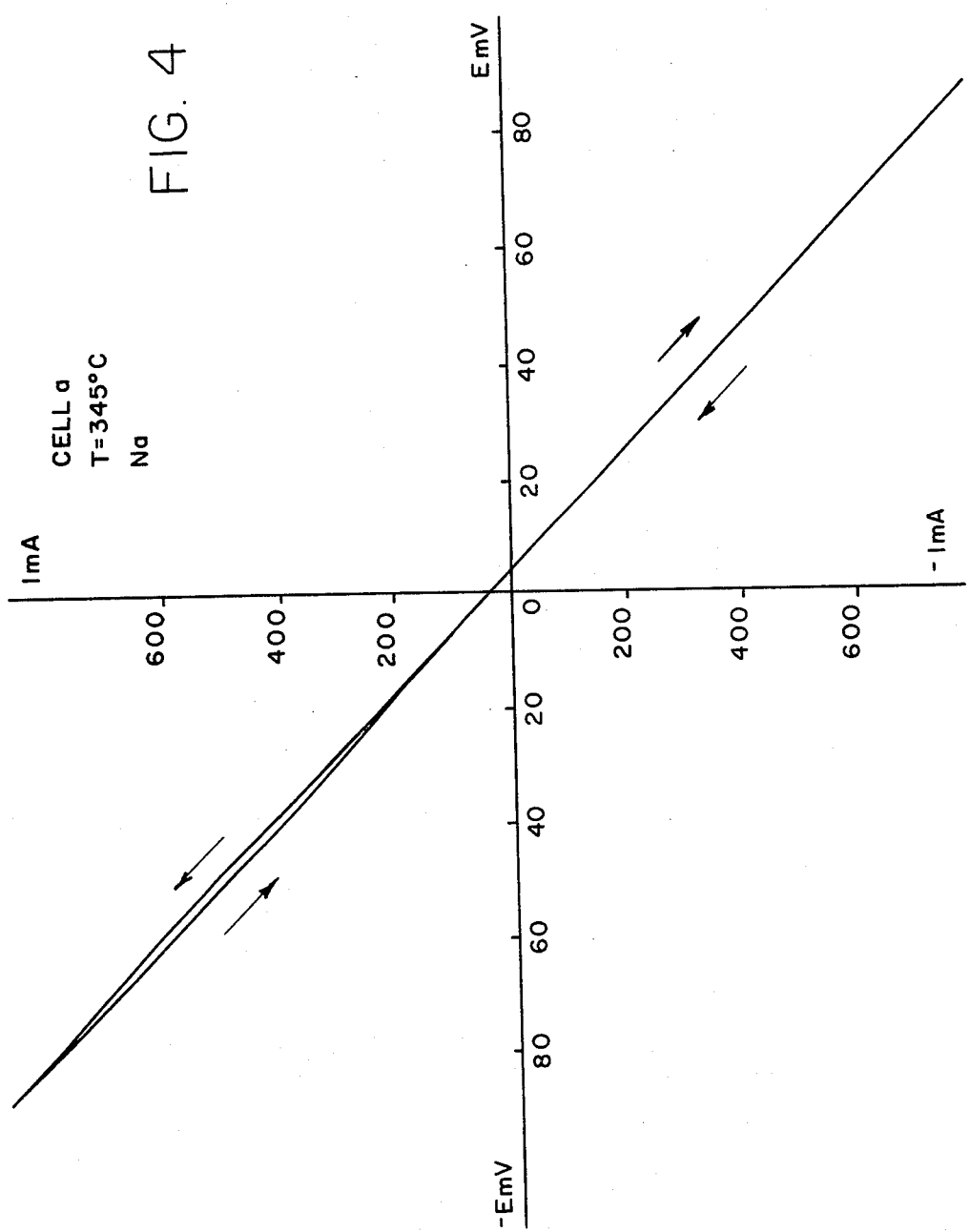
FIG. 4 is a plot of voltage vs. current for a sodium-sodium electrochemical cell without a reactive metal additive.
Figure 5:
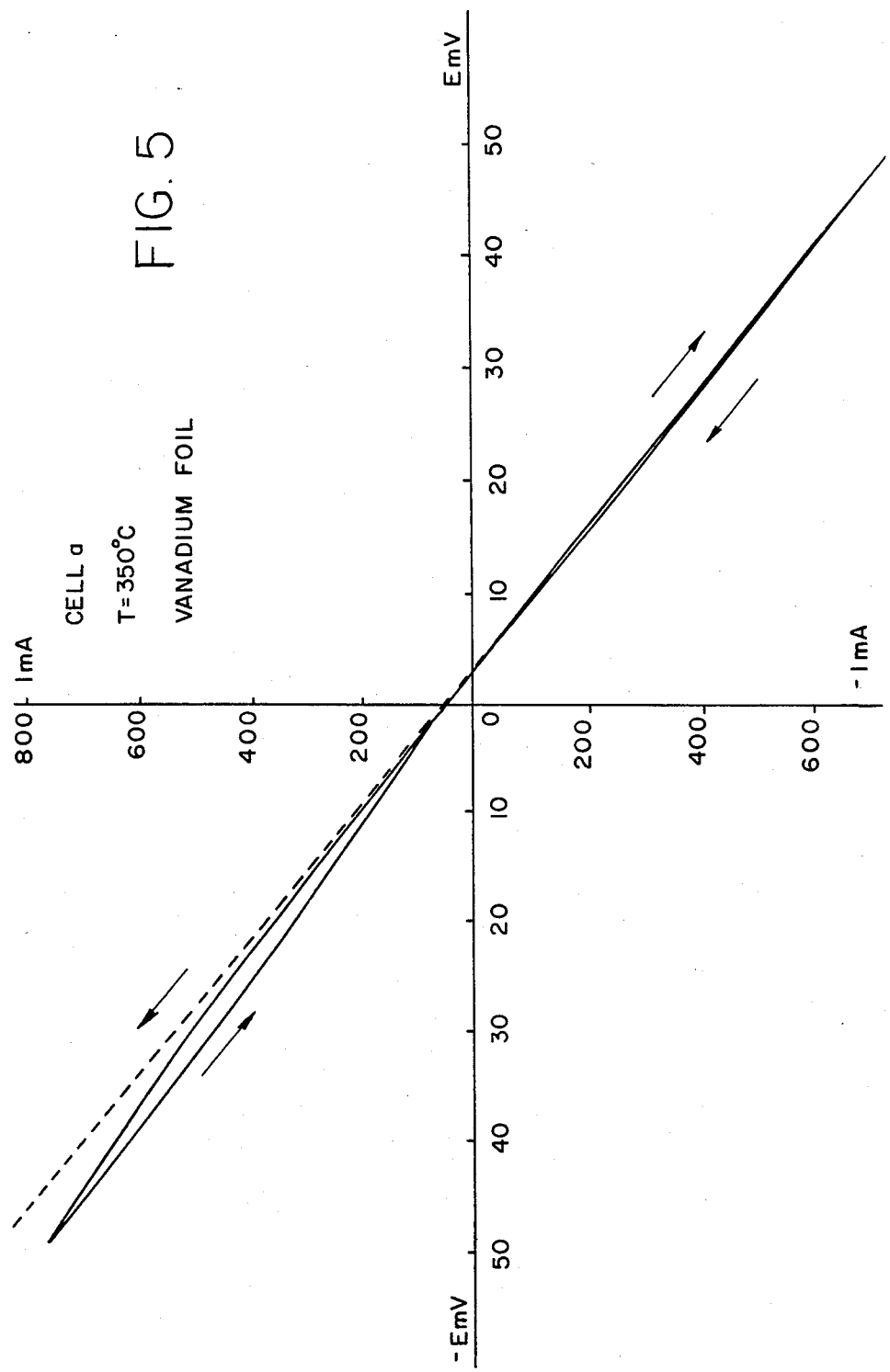
FIG. 5 is a plot of voltage vs. current for the same cell as that plotted in FIG. 4 after the addition of vanadium foil to the sodium.

Voltammetry curves, in which current vs. voltage is plotted, were obtained for a sodium-sodium cell of the type shown in FIG. 3. The cell was first tested with sodium which was saturated with oxygen, and FIG. 4 was obtained, giving a cell resistance of about 0.1 ohm. After vanadium foil was added to the sodium, the cell resistance decreased to 0.065 ohm, and FIG. 5 was obtained. A similar cell had a lower initial resistance, and there was no significant change in cell resistance when vanadium foil was added to this second cell. Probably the first cell had an oxide film at the interface between the beta"-alumina tube and the molten sodium electrode, while the second cell had no such oxide film. Thus, the addition of the reactive metal, vanadium, lowered the resistance of the first cell, which had an oxide film but had not effect on the resistance of the second cell.

The electrochemical cells of the invention may be the types shown in FIG. 1 and FIG. 2 respectively, both of which are sodium-sodium cells. In FIG. 1, the electrochemical cell 10 includes an alumina tube 11 which serves as an impervious solid electrolyte for holding a first molten sodium metal electrode 12 and separating it from a second molten metal electrode 13 which is also molten sodium. An outer cannister 14 is constructed of stainless steel and includes upper and lower portion which are assembled together with a copper gasket 15 in between. Alumina tube 11 is positioned in the cannister 14 by means of alumina disk 16. A nickel wire 17 extends into tube 11 and serves as a working electrode. Reference electrode 18, positioned in the upper portion of cannister 14, is attached to tube 11 and a counter electrode is provided by the body of the cannister 14. A boron nitride lid 19 is fitted onto tube 11.

In FIG. 3, electrochemical cell 20 includes an alpha alumina tube 21 which contains molten sodium metal 22 as the first electrode. Tube 21 has sealed to its bottom by means of glass seal 23 an impervious solid beta"-alumina electrolyte disk 24. Crucible 25 contains a second molten sodium electrode 26 into which thermocouple 27 and an outer resistivity measuring electrode 28 extend. Molybdenum electrode 29 extends into tube 21 to contact disk 24 and serves as an inner resistivity measuring electrode.

While a specific embodiment of an electrochemical cell has been illustrated and described in accordance with this invention, modifications and changes of the apparatus, parameters, material, etc. will become apparent to those skilled in the art, and it is intended to cover in the appended claims all such modifications and changes which come within the scope of this invention.

What is claimed is:

1. In an improved electrochemical cell comprising:

a first electrode of a molten alkali metal;

a solid, impervious electrolyte containing a mobile alkali metal ion of the same alkali metal as is present in said first electrode, said electrolyte separating said first electrode from a second electrode; and, a second electrode of a molten alkali metal receptive to the mobile alkali metal ion in said electrolyte;

the improvement consisting of the inclusion of a metal oxygen scavenger in contact with said first electrode whereby alkali metal oxide, which can form during operation of said cell from said first electrode and oxygen, is reduced if not eliminated during operation of said cell.

2. The electrochemical cell of claim 1 wherein said second electrode comprises the same alkali metal as is in said first electrode.

3. The electrochemical cell of claim 1 wherein said first electrode is sodium.

4. The electrochemical cell of claim 3 wherein the second electrode is sodium.

5. The electrochemical cell of claim 1 wherein said metal oxygen scavenger is interspersed with said first electrode material.

6. The electrochemical cell of claim 1 wherein said metal oxygen scavenger has an increased surface area.

7. An improved electrochemical cell comprising:

a first electrode of a molten alkali metal;

a metal oxygen scavenger selected from manganese, vanadium, zirconium, titanium or combinations thereof in contact with said first electrode;

a solid, impervious electrolyte containing a mobile alkali metal ion of the same alkali metal as is present in said first electrode, said electrolyte separating said first electrode from a second electrode; and, a second electrode of a molten alkali metal receptive to the mobile alkali metal ion in said electrolyte.

* * * * *